(12) United States Patent
Nagasaki

(10) Patent No.: US 6,429,912 B2
(45) Date of Patent: Aug. 6, 2002

(54) DISPLAY MODULE PROTECTIVE STRUCTURE AND METHOD FOR MANUFACTURING THE SAME

(75) Inventor: Yutoku Nagasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/768,277

(22) Filed: Jan. 25, 2001

(30) Foreign Application Priority Data

Jan. 28, 2000 (JP) ........................................ 2000-020414

(51) Int. Cl.[7] ...................... G02F 1/1333; G02F 1/1335
(52) U.S. Cl. .............................................. 349/58; 60/62
(58) Field of Search ............................... 349/58, 60, 62

(56) References Cited

U.S. PATENT DOCUMENTS 5,814,837 A * 9/1998 Okazaki ...................... 257/91
6,034,751 A * 3/2000 Kamiya ....................... 349/60
6,225,741 B1 * 5/2001 Nakamura et al. .......... 313/506
6,292,239 B1 * 9/2001 Nagamura et al. ............ 349/58
6,295,103 B1 * 9/2001 Yamatani et al. ............. 349/58

FOREIGN PATENT DOCUMENTS

JP             10-282900         10/1998

* cited by examiner

Primary Examiner—William L. Sikes
Assistant Examiner—Julie Ngo
(74) Attorney, Agent, or Firm—Young & Thompson

(57) ABSTRACT

A display module includes a liquid crystal panel for displaying a predetermined image, a light emitter which is arranged on the liquid crystal panel and emits light for displaying an image, and a bag which contains and fixes the liquid display panel and the light emitter. The bag includes at least an area through which an image display area of the liquid crystal panel can be seen. The bag has an opening which is sealed up, and the inside thereof is retained in a low-pressure atmosphere.

22 Claims, 14 Drawing Sheets

DISPLAY MODULE PROTECTIVE STRUCTURE AND METHOD FOR MANUFACTURING THE SAME

BACKGROUND OF THE INVENTION

1. Field of the Invention

The present invention relates to a display module and a manufacturing method thereof, and, more particularly, to a display module having a backlight and a liquid crystal panel incorporated with each other and a manufacturing method thereof.

2. Description of the Related Art

Generally, an LCD module is composed of a backlight unit having a backlight and a display unit having a liquid crystal panel, both of which are separately manufactured and are tightened up together with screws, etc.

In such an LCD module, because the backlight unit and the display unit are tightened and formed up with screws, etc., a lot of parts are needed in one LCD module. In other words, processes for manufacturing the LCD modules are quite complicated.

In order to reduce the number of parts, a well-known LCD module is one including the liquid crystal panel and the backlight which are incorporated with each other. One example of such an LCD module is disclosed in Unexamined Japanese Patent Application KOKAI Publication No. H10-282900.

In the LCD module disclosed in the above publication, a metal lower shield case 21 is engaged with a metal upper shield case 22, as shown in FIG. 12. The lower shield case 21 and the upper shield case 22 are connected with each other with non-illustrated hooks, thus forming a case of the LCD module.

Inside the case of the LCD module, a conductive optical plate 213, which includes a light source 218, and an optical sheet 24, which includes a diffusion sheet 214 and a prism sheet 215 layered on the diffusion sheet 214, are included in a layered structure. Further, metal supporting plates 26 each including a projection 221 on the lower surface thereof is placed on the optical sheet 24. A liquid crystal panel 28 including polarizing plates 211 and 212 is affixed onto the supporting plates 26 with both-sided adhesive tape 27. Reference numerals 216 and 217 denote reflection plates in FIG. 12.

As explained, the LCD module disclosed in Unexamined Japanese Patent Application KOKAI Publication No. H10-282900 includes a lower shield case 21 and an upper shield case 22 which are made of metal. In this structure, the LCD module may not desirably operate.

Particularly, when the lower shield case 21 contacts the upper shield case 22 to be engaged with each other, a portion thereof may be rubbed with each other and metal dusts may come out. Such metal dusts may cause a short circuit between terminals in the display module. Hence, the LCD module does not desirably operate.

Since the metal cases are used, the LCD module is manufactured at a high cost.

The disclosure of Unexamined Japanese Patent Application KOKAI Publication No. H10-282900 is herein incorporated by reference in its entirety.

SUMMARY OF THE INVENTION

It is accordingly an object of the present invention to provide a display module, which can be manufactured at a low cost and can stably operate, and a method for manufacturing the same.

In order to accomplish the above object, according to the first aspect of the present invention, there is provided a display module comprising:

a liquid crystal panel which includes a display area for displaying an image, and displays a predetermined image;

a light emitter which is arranged on the liquid crystal panel, and emits light for displaying an image; and a resin member which contains and fixes the liquid crystal panel and the light emitter, and includes at least an area through which the display area can externally be seen.

According to this invention, a display module, which can stably operate and can be manufactured at a low price, is provided.

The resin member may be a bag having an opening which is closed.

An inside of the resin member may be retained in a low-pressure atmosphere.

The display module may further comprise a connector for supplying a signal and power source for displaying a predetermined image, and the resin member may have a lead-through hole for taking out the connector, and a peripheral section of the lead-through hole may be sealed up.

A peripheral section of the mounting hole may be sealed up.

The resin member may be a pair of shaped resins which are formed in an inward shape which is substantially same as an outward shape of the liquid panel and the light emitter which are joined together.

The resin member may have a mounting hole for mounting the display module on a corner of the resin member.

A peripheral section of the mounting hole may be reinforced with a reinforcing member.

The light emitter may be larger in size than the liquid crystal panel, and include the mounting hole in an area of the light emitter which sticks out from the liquid crystal panel.

The resin member may be formed from a transparent member.

According to the second aspect of the present invention, there is provided a method for manufacturing a display module, comprising:

forming a semi-finished product by putting a liquid crystal panel, which has a display area for displaying an image and displays a predetermined image, together with a light emitter, which emits light for displaying an image;

inserting the semi-finished product into a resin member including an area through which at least the display area can externally be seen; and fixing the semi-finished product inside the resin member.

The resin member may be a bag; and the fixing may include removing air or gas from the resin member, thereby hermetically connecting the resin member with the semi-finished product.

The display panel may include a connector for supplying a signal and power source for displaying a predetermined image, and a lead-through hole for taking out the connector may be formed, after the semi-finished product is fixed inside the resin member.

The forming the lead-through hole may include forming the lead-through hole after a peripheral section of the hole is sealed up.

The forming the lead-through hole may include sealing up the peripheral section of the lead-through hole.

The display panel may include a connector for supplying a signal and power source for displaying a predetermined image, and a lead-through hole for taking out the connector in the resin member may be formed, before fixing the semi-finished product inside the resin member.

The resin member may have an opening for inserting the semi-finished product; and the fixing the semi-finished product inside the resin member may include removing air or gas from the resin member through the head-through hole, after sealing up the opening.

The fixing the semi-finished product may include sealing up the opening using a thermocompression technique or adhesive tape.

The resin member may be a pair of shaped resins which are formed as to have an inward shape which is substantially same as an outward shape of a state of the liquid crystal panel and the light emitter being joined together; and the fixing the semi-finished product may include
sandwiching the semi-finished product with the pair of shaped resins, and
sealing up peripheral sections of the pair of shaped resins sandwiching the semi-finished product.

The method for manufacturing a display module may further comprise cutting off a predetermined area of the resin member, thereby exposing the display area.

The light emitter may be larger in size than the liquid crystal panel, and include a mounting hole for mounting the display module into another device in an area of the light emitter which sticks out from the liquid crystal panel, and a penetrating hole may be formed by forming a hole in a position of the resin member which corresponds to a position of the mounting hole, after fixing the semi-finished product inside the resin member.

The sealing up may include sealing the peripheral sections of the pair of shaped resins using a thermocompression technique or with adhesive tape.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENTS

An LCD (Liquid Crystal Display) module according to the first embodiment of the present invention will now be explained with reference to the accompanying drawings.

Figure 1:
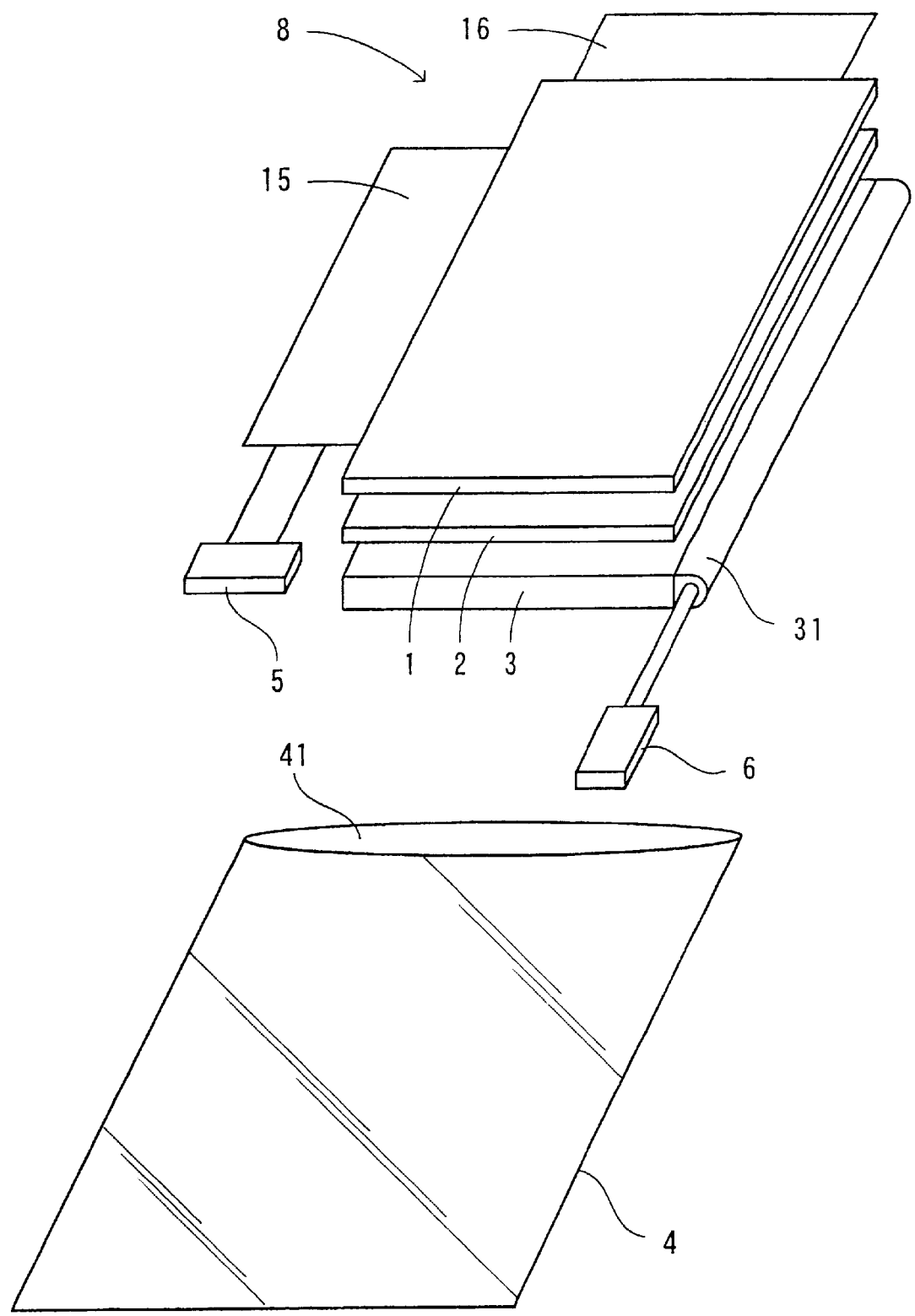
FIG. 1 is a diagram: showing the structure of an LCD module according to the first embodiment of the present invention.

The LCD module of the first embodiment comprises a display panel 1, an optical sheet 2, a conductive optical plate 3, and a bag 4, as shown in FIG. 1. The display panel 1, the optical sheet 2, and the conductive optical plate 3 are enclosed into the bag 4, thereby manufacturing the LCD module.

The display panel 1 is formed of liquid crystal which is enclosed between a pair of substrates, and displays predetermined letters, characters, images, etc. by applying a predetermined voltage to the liquid crystal. The display panel 1 has flexible wiring sheets 15 and 16 on at least two sides thereof, respectively. The flexible wiring sheets 15 and 16 processes a control signal from any external device, and supplies the liquid crystal with a predetermined voltage. The display panel 1 has an interface connector 5 for connecting the flexible wiring sheets 15, 16 and the external device.

Figure 2A:
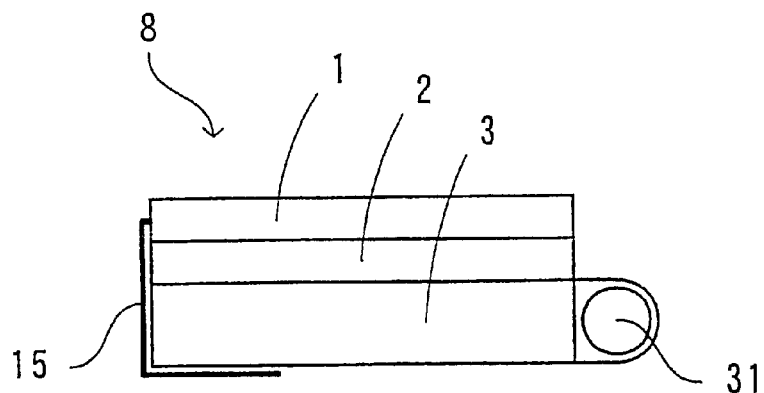
FIGS. 2A and 2B are diagrams each showing a semi-finished product forming the LCD module of FIG. 1.
Figure 2B:
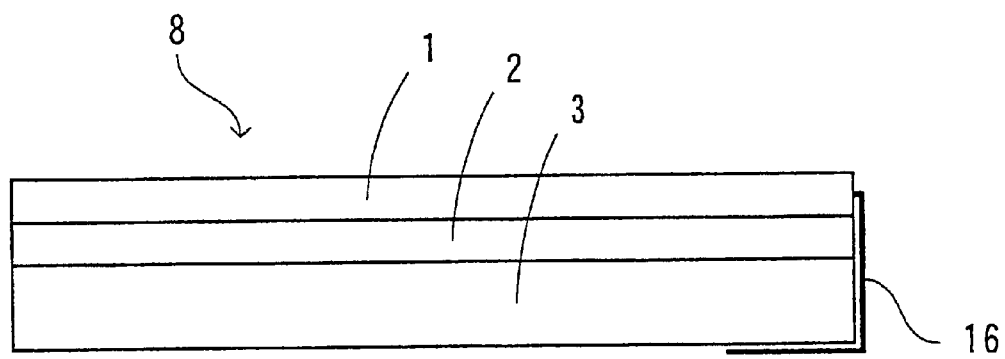

When the display panel 1, the optical sheet 2 and the conductive optical plate 3 are enclosed inside the bag 4, the flexible wiring sheets 15 and 16 are bent to hold the optical sheet 2 and the conductive optical plate 3, as illustrated in FIGS. 2A and 2B. In this structure, the display panel 1, the optical sheet 2 and the conductive optical plate 3 are temporarily fixed. The display panel 1, the optical sheet 2, and the conductive optical plate 3, in the state where they are temporarily fixed by the flexible wiring sheets 15 and 16, are hereinafter referred to as a semi-finished product 8.

The optical sheet 2 includes a light adjustment sheet, such as a prism sheet, etc. and a diffusion sheet which are layered on one top of another, and arranged on the display panel 1. The optical sheet 2 evenly sets the luminance of the backlight for displaying letters, characters, etc.

The conductive optical plate 3 is arranged on the optical sheet 2, and emits the backlight. The conductive optical plate 3 includes a light source 31 arranged on the side surface thereof. The light source 31 is a fluorescent tube or the like. The light emitted from the light source 31 is radiated from the surface of the conductive optical plate 3 through the inside of the conductive optical plate 3. The light radiated from the surface of the conductive optical plate 3 is so-called a backlight. The conductive optical plate 3 has a lamp connector 6 for connecting the light source 31 to the power source.

The bag 4 is transparent, and made of polyethylene, etc. The bag 4 has an opening 41 for enclosing the semi-finished product 8. The inside of the bag 4 enclosing the semi-finished product 8 is retained in a low-pressure atmosphere. Thus, as illustrated in FIG. 3, the bag 4 has a sealing section 71 for preventing any outer air entering from the opening 41.

Figure 3:
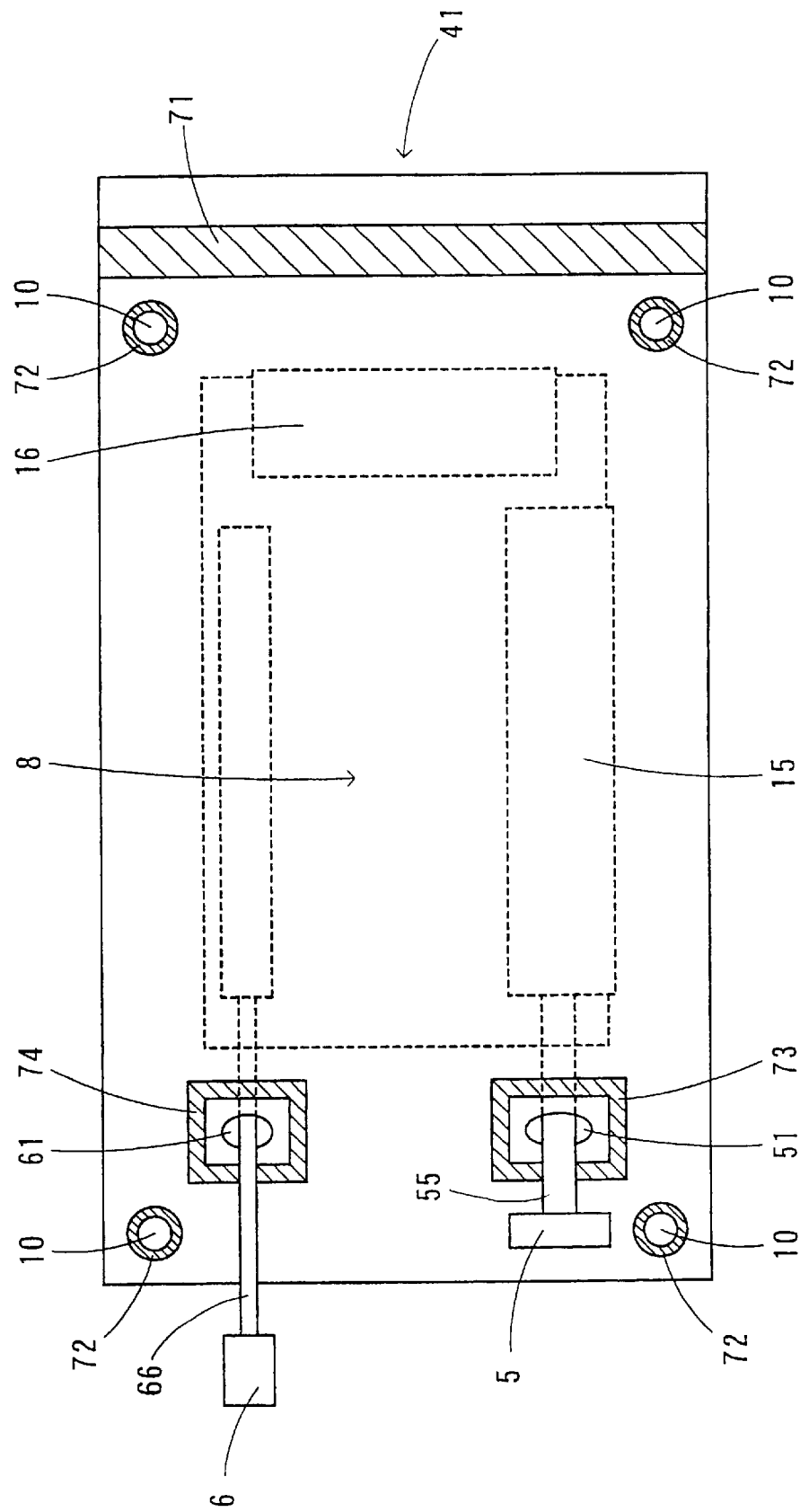
FIG. 3 is a plan view of the LCD module of the first embodiment.

Four mounting holes 10 for mounting the LCD module into any other device are formed on the four corners of the bag 4, respectively, as shown in FIG. 3. A sealing section 72 for preventing any outer air is formed around each of the four mounting holes 10.

A lead-through hole 51 for taking out a flexible lead 55 and the interface connector 5 is formed in a position corresponding to a position of the interface connector 5 inside the LCD module. A lead-through hole 61 for taking out a flexible lead 66 and the lamp connector 6 is formed in a position corresponding to a position of the lamp connector 6 inside the LCD module. Likely to the above, sealing sections 73 and 74 for preventing any outer air are formed around the lead-through holes 51 and 61, respectively.

A method for manufacturing the LCD module having the above structure will now be described.

Figure 4:
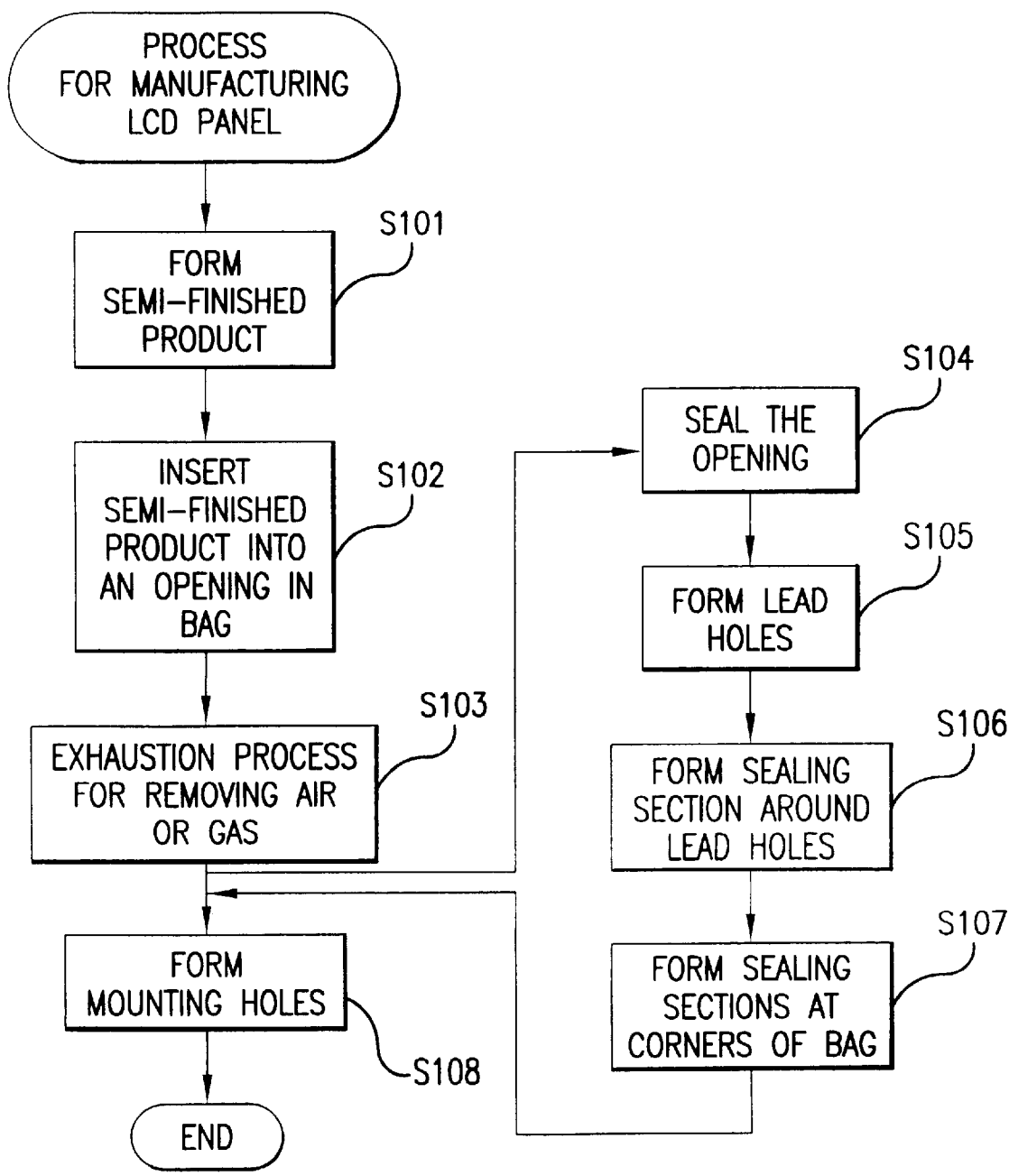
FIG. 4 is a flowchart for explaining a process for manufacturing the LCD module according to the first embodiment.

FIG. 4 is a flowchart for explaining a process for manufacturing the LCD module.

First of all, the semi-finished product 8 is to be formed (Step S101).

Figure 5A:
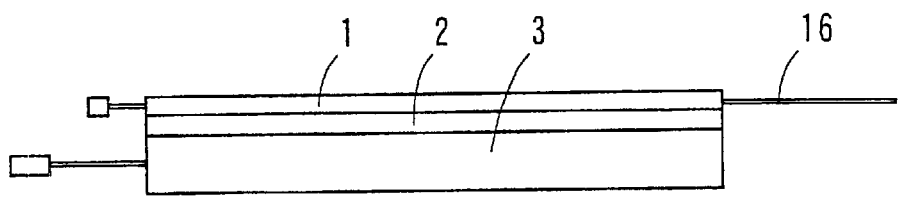
FIGS. 5A to 5H are diagrams each showing a manufacturing process of the LCD module.

Particularly, as illustrated in FIG. 5A, the display panel 1, the optical sheet 2, and the conductive optical plate 3 are laminated sequentially in this order.

Figure 5B:
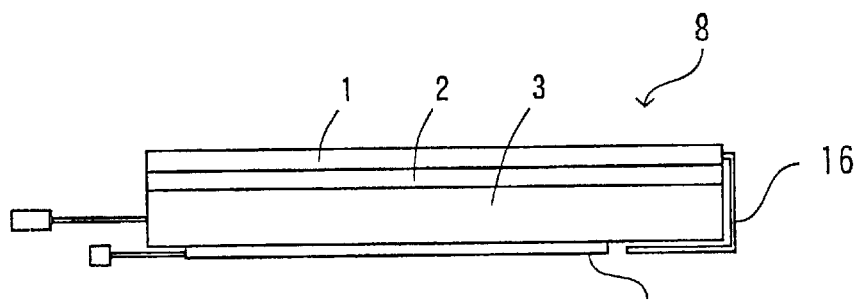

Subsequently, as illustrated in FIG. 5B, the flexible wiring sheets 15 and 16 of the display panel 1 are bent so as to temporarily fix the display panel 1, the optical sheet 2, and the conductive optical plate 3. Having performed this, the semi-finished product 8 is completely formed.

Figure 5C:
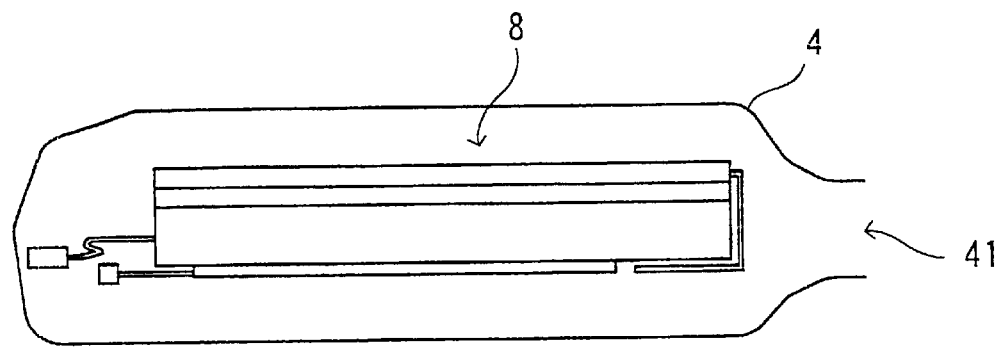

As shown in FIG. 5C, the semi-finished product 8 is inserted into the bag 4 from the opening 41 (Step S102).

After this, an exhaustion process for removing gas or air from the bag 4 is carried out using a vacuum pump, etc. (Step S103).

Figure 5D:
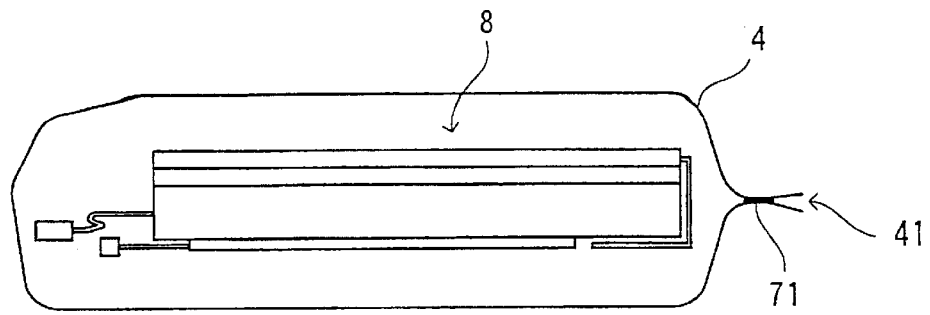

Particularly, as shown in FIG. 5D, the sealing section 71 is formed using a thermocompression technique, thereby to close the opening 41 (S104).

Figure 5E:
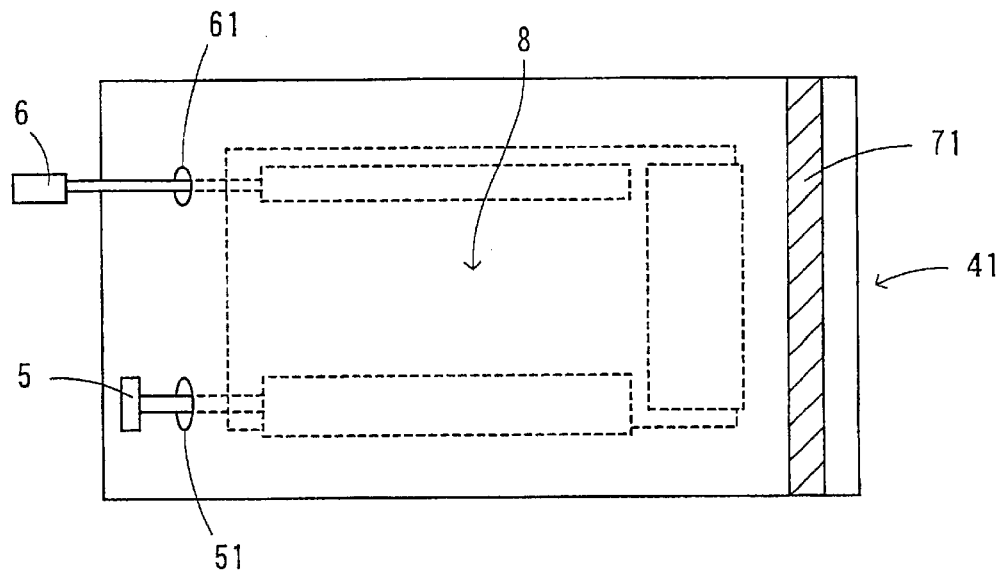

Subsequently, the lead-through holes 51 and 61 are formed in the positions respectively corresponding to the positions of the interface connector 5 and the lamp connector 6 inside the bag 4 (S105). Then, as shown in FIG. 5E, the interface connector 5 is taken out through the lead-through hole 51, and the lamp connector 6 is taken out through the lead-through hole 61.

Figure 5F:
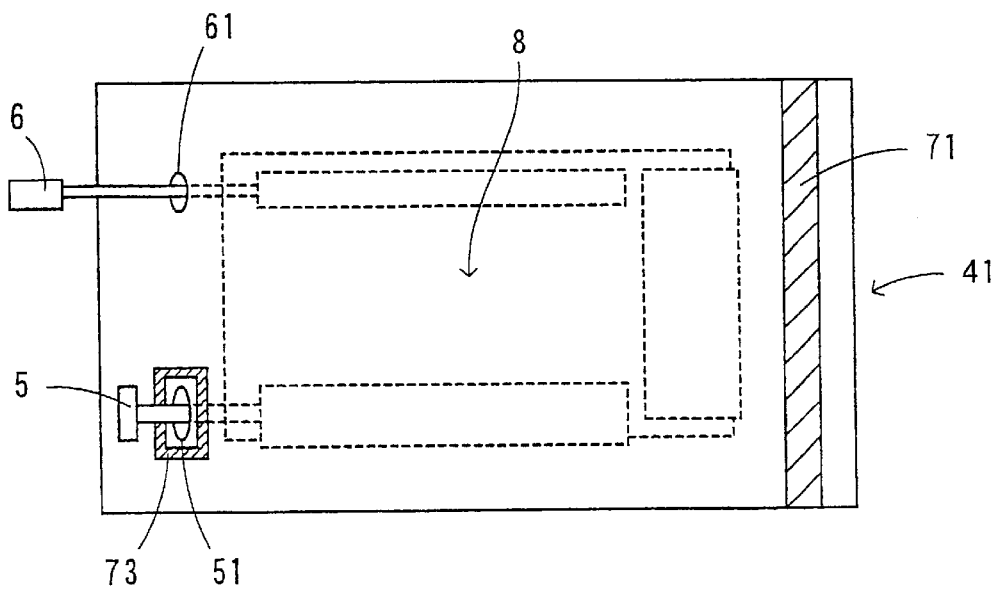
Figure 6A:
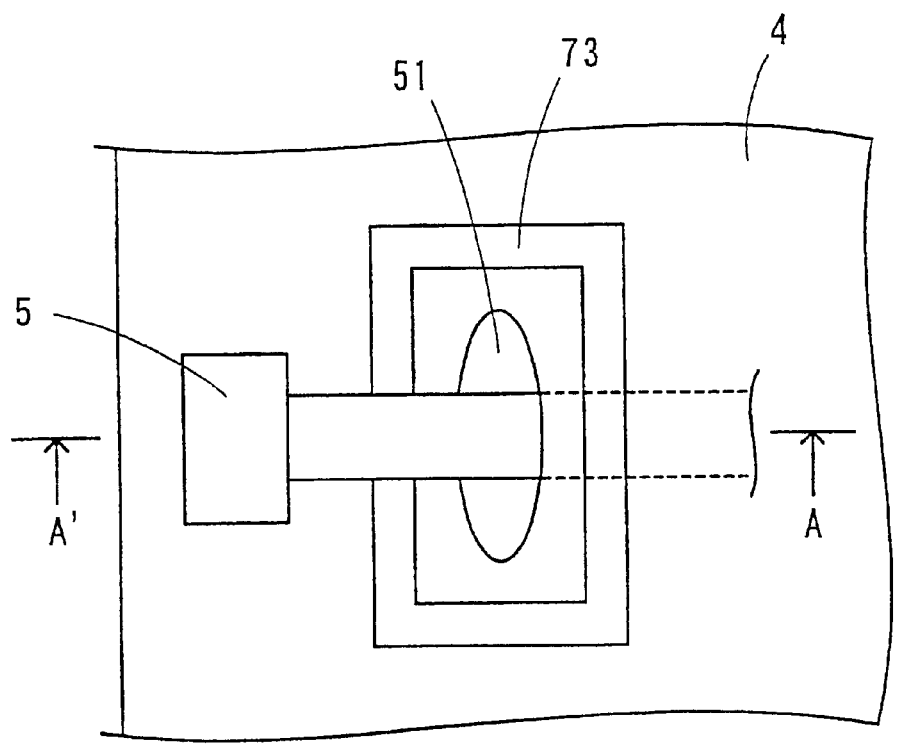
FIG. 6A is a plan view showing the structure of peripheral sections of a lead-through hole.
Figure 6B:
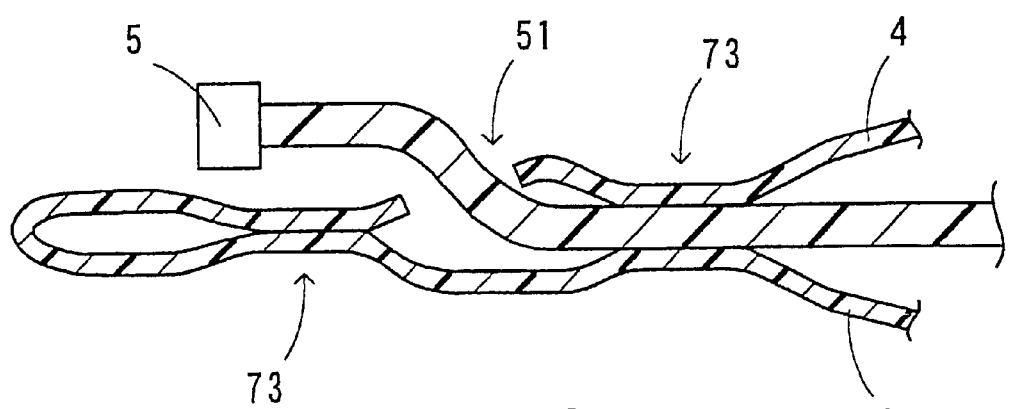
FIG. 6B is a cross sectional view taken along a line A–A' of FIG. 6A.

As shown in FIG. 5F, either one of the sealing section 73 or 74 is formed (S106). For example, the sealing section 73 is formed around the lead-through hole 51, using the thermocompression technique. At this time, as shown in FIGS. 6A and 6B, the bag 4 is hermetically connected together with a portion of the interface connector 5. Hence, no outer air should enter the bag 4 from that connected section.

Thereafter, air or gas is removed from the gag 4 from the lead-through hole 61 using a vacuum pump, etc., thereby to hermetically connect the bag 4 with the semi-finished product 8. Hence, the semi-finished product 8 (the display panel 1, the optical sheet 2, and the conductive optical plate 3) are fixed inside the bag 4.

Figure 5G:
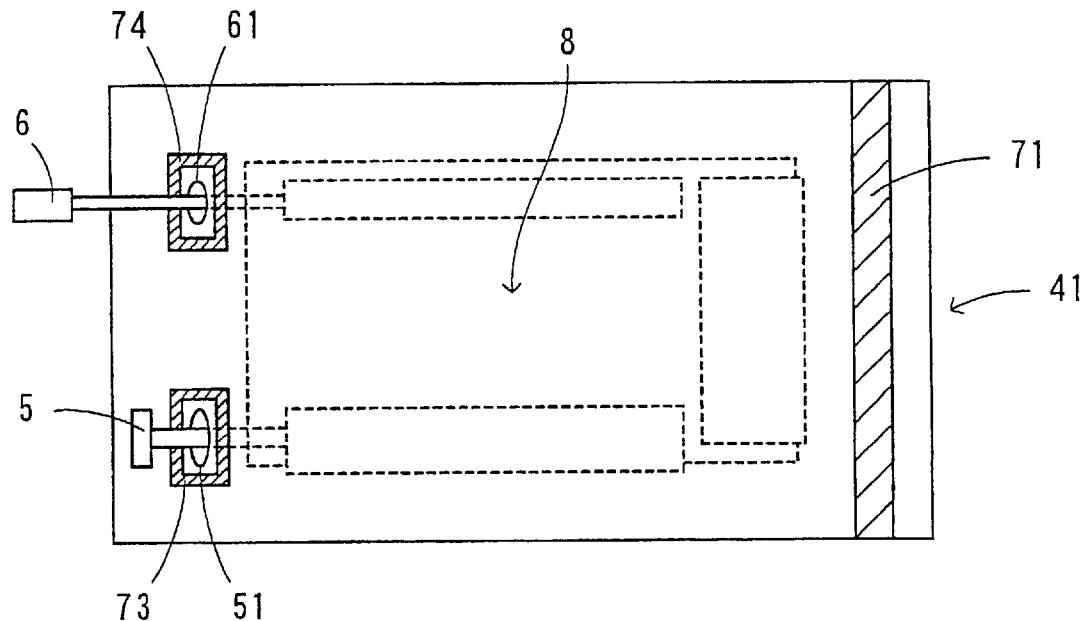

As shown in FIG. 5G, the sealing section 74 is formed around the lead-through hole 61 using the thermocompression technique, thus completing the exhaustion process. Hence, the inside of the bag 4 is retained in a low-pressure atmosphere.

Figure 5H:
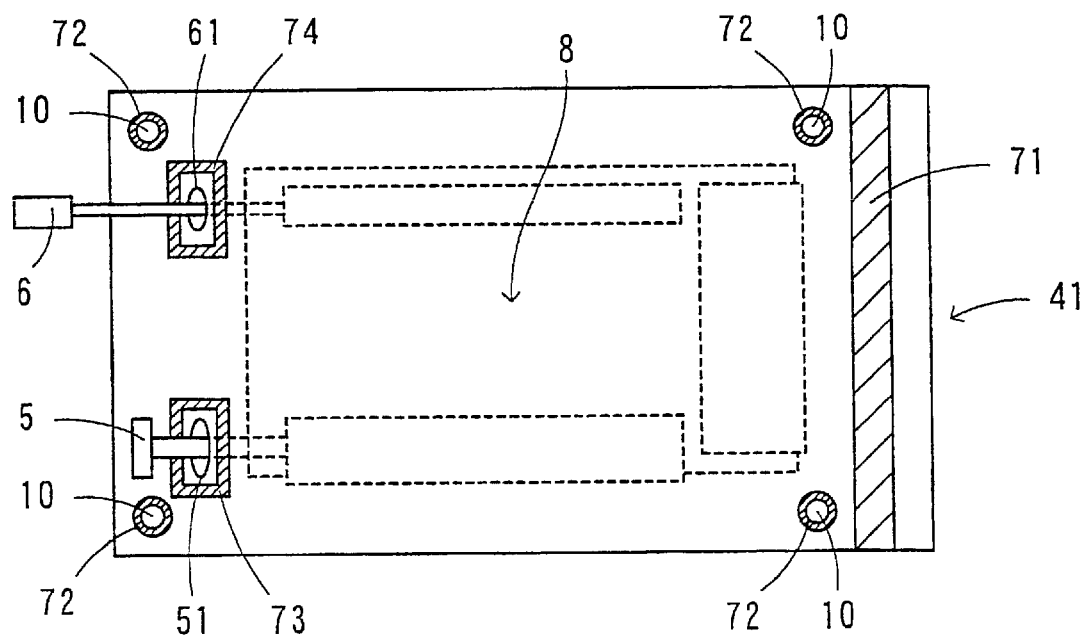

The sealing sections 72 are formed on the four corners of the bag 4 using the thermocompression technique (S107). Then, as shown in FIG. 5H, the mounting holes 10 are formed (Step S108), completing the process for manufacturing the LCD module.

Accordingly, the inside of the bag 4 is retained in a low-pressure atmosphere. This simply achieves the display panel 1, the optical sheet 2, and the conductive optical plate 3 to be fixed. Therefore, the LCD module can easily be formed. Since the bag 4 made of polyethylene, no metal dust should come out, and the LCD module which is operable in a stable manner can be manufactured. Because it is not necessary to employ a metal case, the LCD module can be manufactured at a low cost.

An LCD module according to the second embodiment of the present invention will now be described with reference to the accompanying drawings.

Figure 7A:
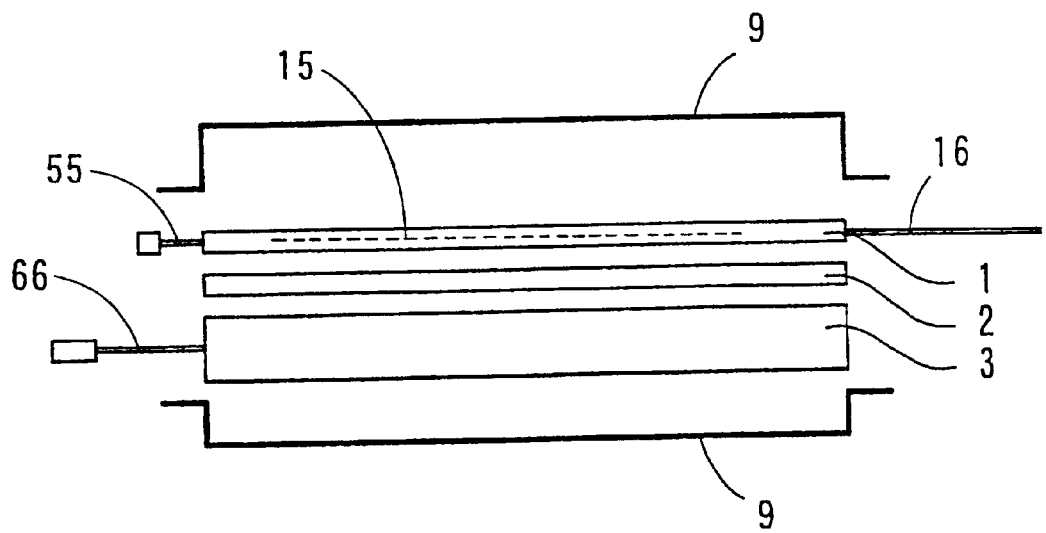
FIGS. 7A and 7B are diagrams each showing the structure of an LCD module according to the second embodiment of the present invention.

The LCD module according to the second embodiment has a pair of shaped resins 9 in place of the bag 4 included in the LCD module of the first embodiment. Particularly, as shown in FIG. 7A, the LCD module according to the second embodiment comprises the display panel 1, the optical sheet 2, the conductive optical plate 3, and the pair of shaped resins 9.

The same display panel 1, optical sheet 2 and conductive optical plate 3 which are described in the first embodiment are employed in the LCD module of this embodiment.

A metal mold, which has substantially the same shape as the outward shape of the semi-finished product 8, for example, is filled with a synthetic resin, thereby to form a pair of shaped resins 9. Thus, the inward shape of the joined pair of shaped resins 9 is substantially the same as the outside shape of the semi-finished product 8. The shaped resins 9 are transparent. More particularly, a portion of the shaped resins 9, which corresponds to the portion of the display panel 1 displaying letters, images, etc., is transparent.

Figure 7B:
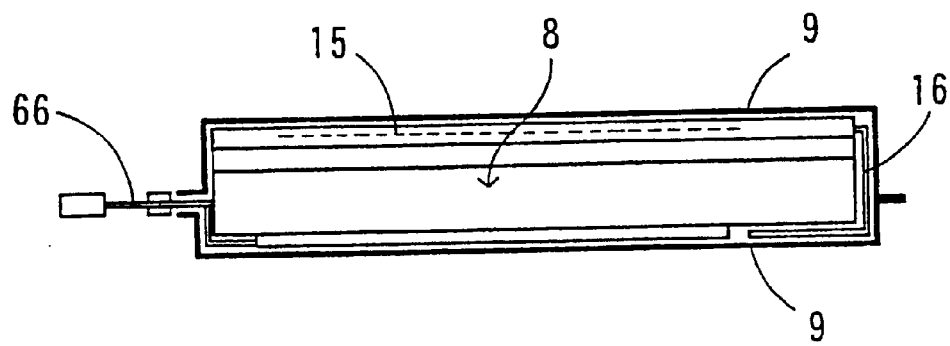

The semi-finished product 8 is inserted between the pair of shaped resins 9, thereby the semi-finished product 8 is fixed, as shown in FIG. 7B. Because the shaped resins 9 has substantially the same shape as that of the semi-finished product 8, the exhaustion process described in the first embodiment is not necessary.

Figure 8A:
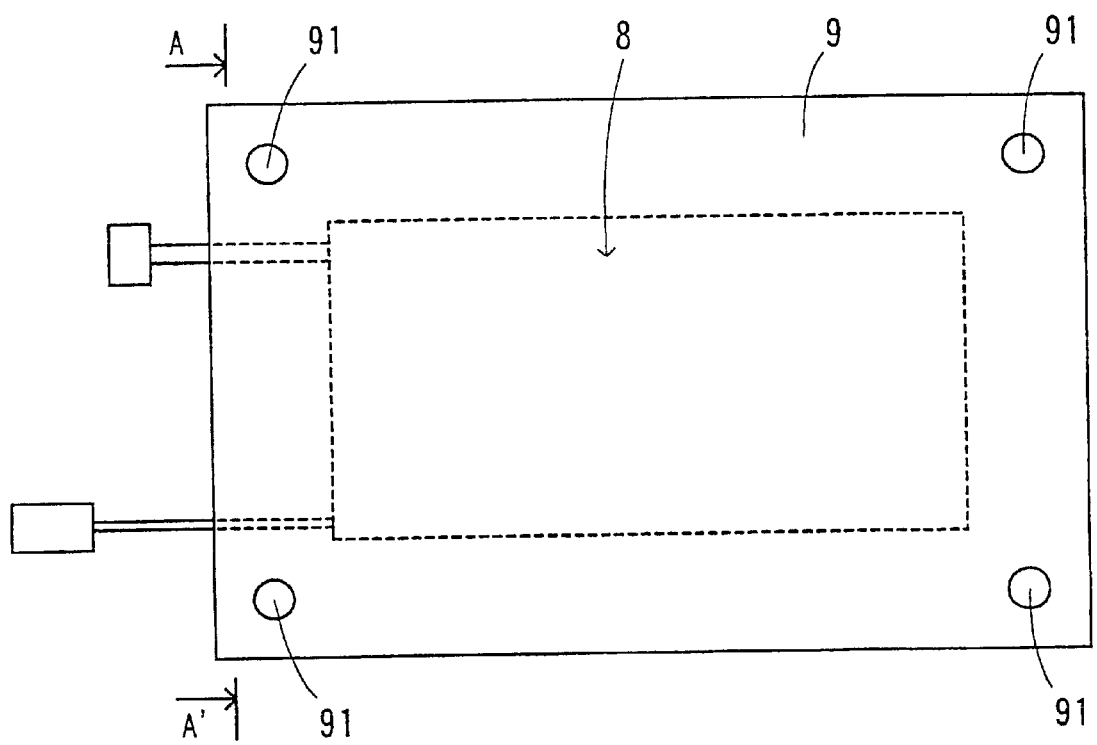
FIG. 8A is a plan view of the LCD module according to the second embodiment.

As illustrated in FIG. 8A, the pair of shaped resins 9 have mounting holes 91 for mounting the LCD module into any other device, on the four corners thereof.

Figure 8B:
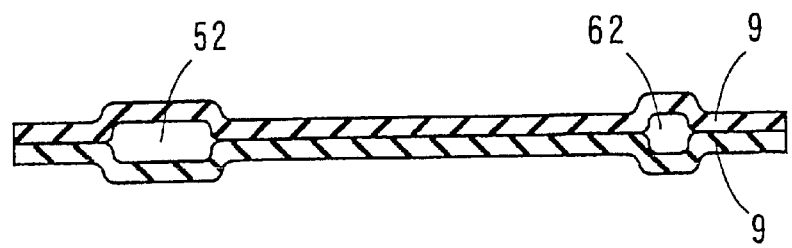
FIG. 8B is a cross sectional view taken along a line A–A' of FIG. 8A.

The pair of shaped resins 9 are put together as shown in FIG. 8B, so as to have spaces 52 and 62 for taking out the interface connector 5 and the lamp connector 6.

A process for manufacturing the above-described LCD module will now be described.

The procedures for forming the semi-finished product 8 are substantially the same as those of the first embodiment.

After the formation of the semi-finished product 8, as illustrated in FIG. 7B, the semi-finished product 8 is sandwiched between the pair of shaped resins 9 which are formed in advance. At this time, the interface connector 5 and the lamp connector 6 are taken out respectively from the spaces 52 and 62 of the shaped resins 9.

After this, the pair of shaped resins 9 melt through heating, for example, the peripheral section thereof, so as to be connected with each other, completing the above-described LCD module.

The formation of the mounting holes 91 may be performed before or after the above-described manufacturing process.

Accordingly, in the structure where the semi-finished product 8 is sandwiched by the pair of shaped resins 9, the display panel 1, the optical sheet 2 and the conductive optical plate 3 can be fixed. Therefore, the LCD module can easily be formed. Since the shaped resins 9 which are formed of synthetic resin, no metal dust should come out, and the LCD module which is operable in a stable manner can be manufactured. Because it is not necessary to employ a metal case, the LCD module can be manufactured at a low cost.

Figure 9:
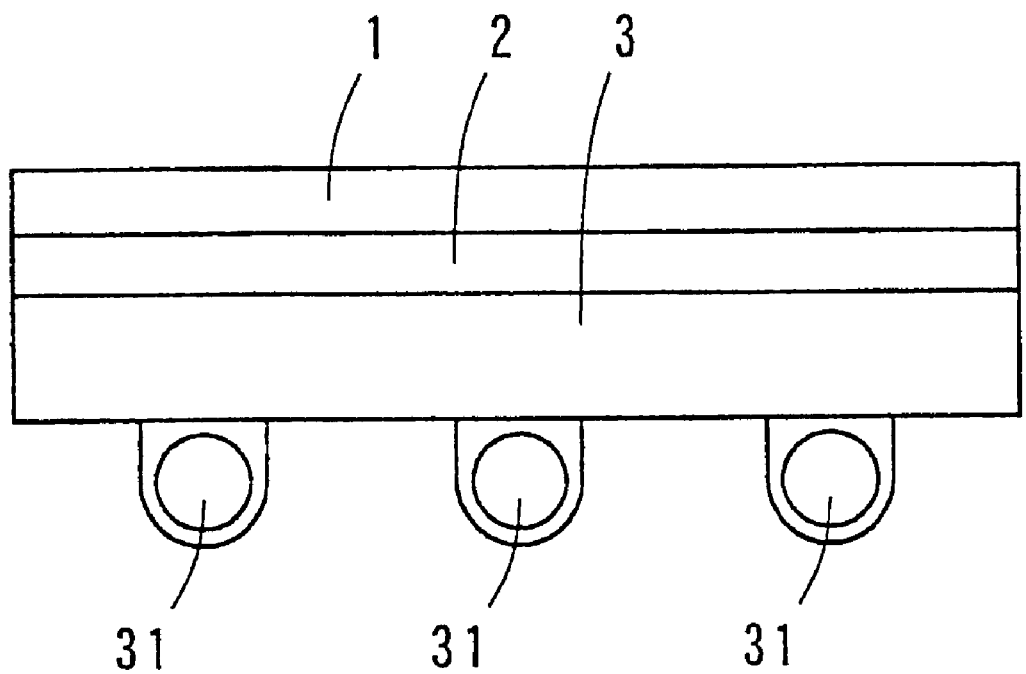
FIG. 9 is a diagram showing another structure of a conductive optical plate.

In the first and second embodiments, the explanations have been made to the edge-light type backlight which includes the light source 31 on the side surface of the conductive optical plate 3. However, as shown in FIG. 9, the LCD module may employ an underneath type backlight, including light sources 31 on the lower surface of the conductive optical plate 3, as illustrated in FIG. 9.

The formation of the lead-through holes 51 and 61, as explained in the first embodiment, may be performed before or after the insertion of the semi-finished product 8 into the bag 4.

In the first embodiment, the air or gas is removed from the bag 4, after the interface connector 5 and the lamp connector 6 are taken out from the bag 4. However, the interface connector 5 and the lamp connector 6 may be taken out after the air or gas is removed therefrom. In this case, after the semi-finished product 8 is inserted into the bag 4 without the lead-through holes 51 and 61, the air is removed from the bag 4, and the sealing section 71 is formed. Thereafter, the sealing sections 73 and 74 are formed, and the lead-through holes 51 and 61 are formed, and finally the interface connector 5 and the lamp connector 6 are taken out from the bag 4.

Figure 10:
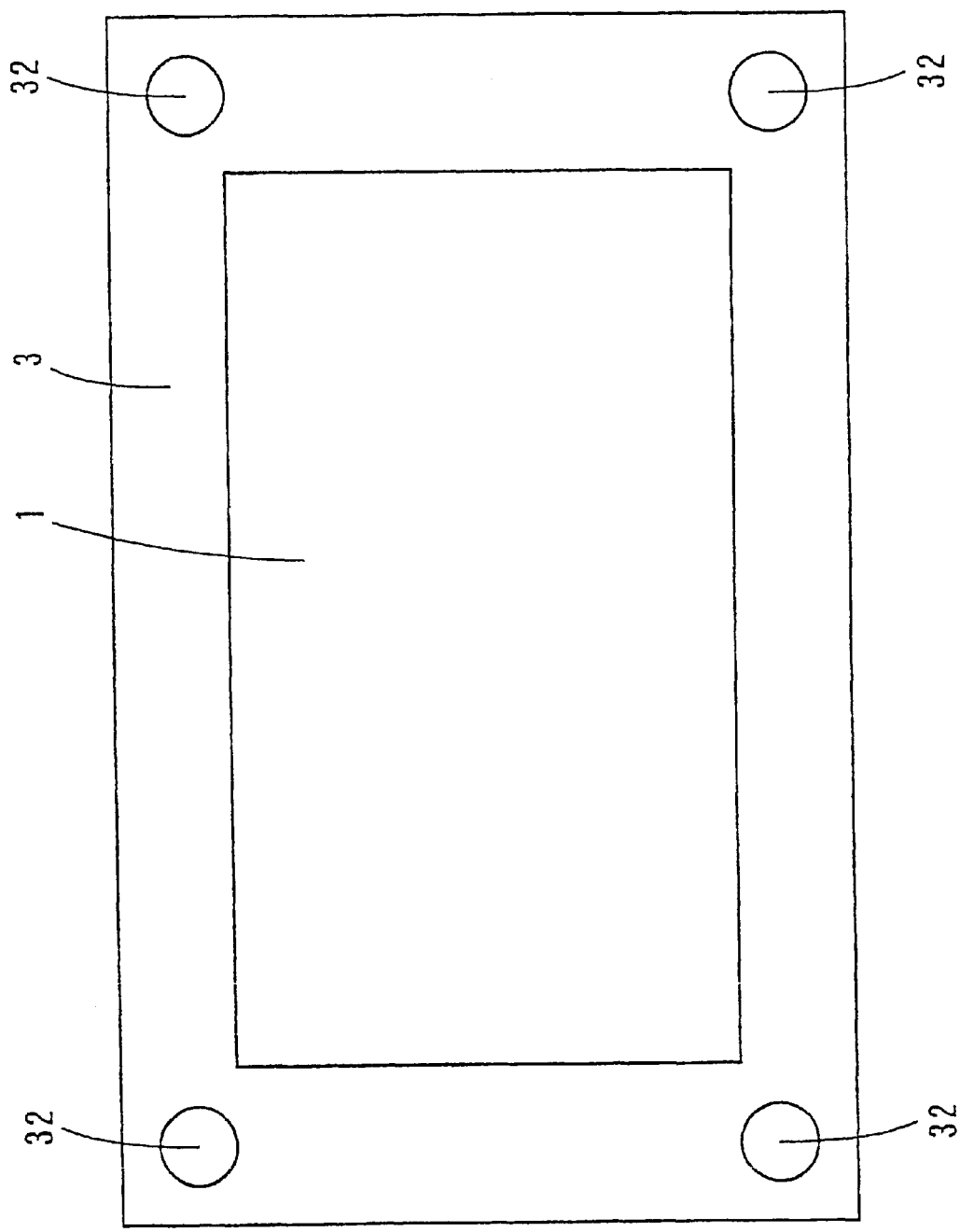
FIG. 10 is a plan view showing the conductive optical plate in a state where the conductive optical plate has mounting holes.

A mounting hole may be formed in the conductive optical plate 3. In more particular, as shown in FIG. 10, the conductive optical plate 3 which is larger than the display panel 1 is used, and four holes 32 are formed on the four corners of the conductive optical plate 3. After the semi-finished product 8 is inserted into the bag 4, or after the semi-finished product 8 is sandwiched by the shaped-resins 9, four holes are made in the four corners of the bag 4 or the shaped resins 9 so as to correspond to the holes 32. Thus formed penetrating holes may be made as the mounting holes.

Figure 11:
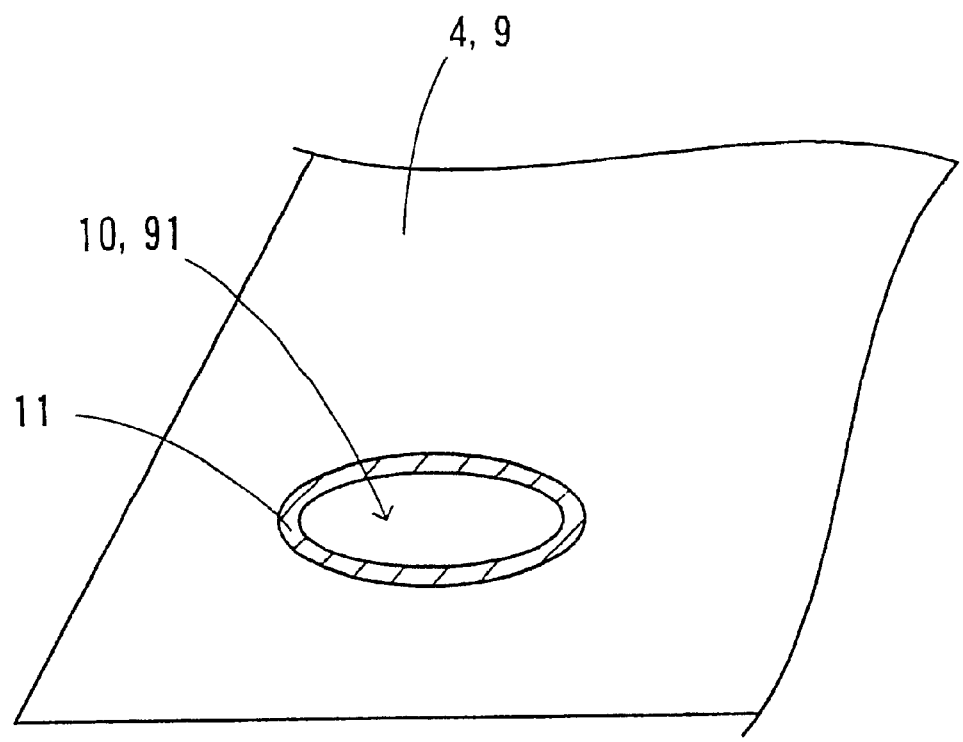
FIG. 11 is a diagram showing one mounting hole having a reinforcing ring.
Figure 12:
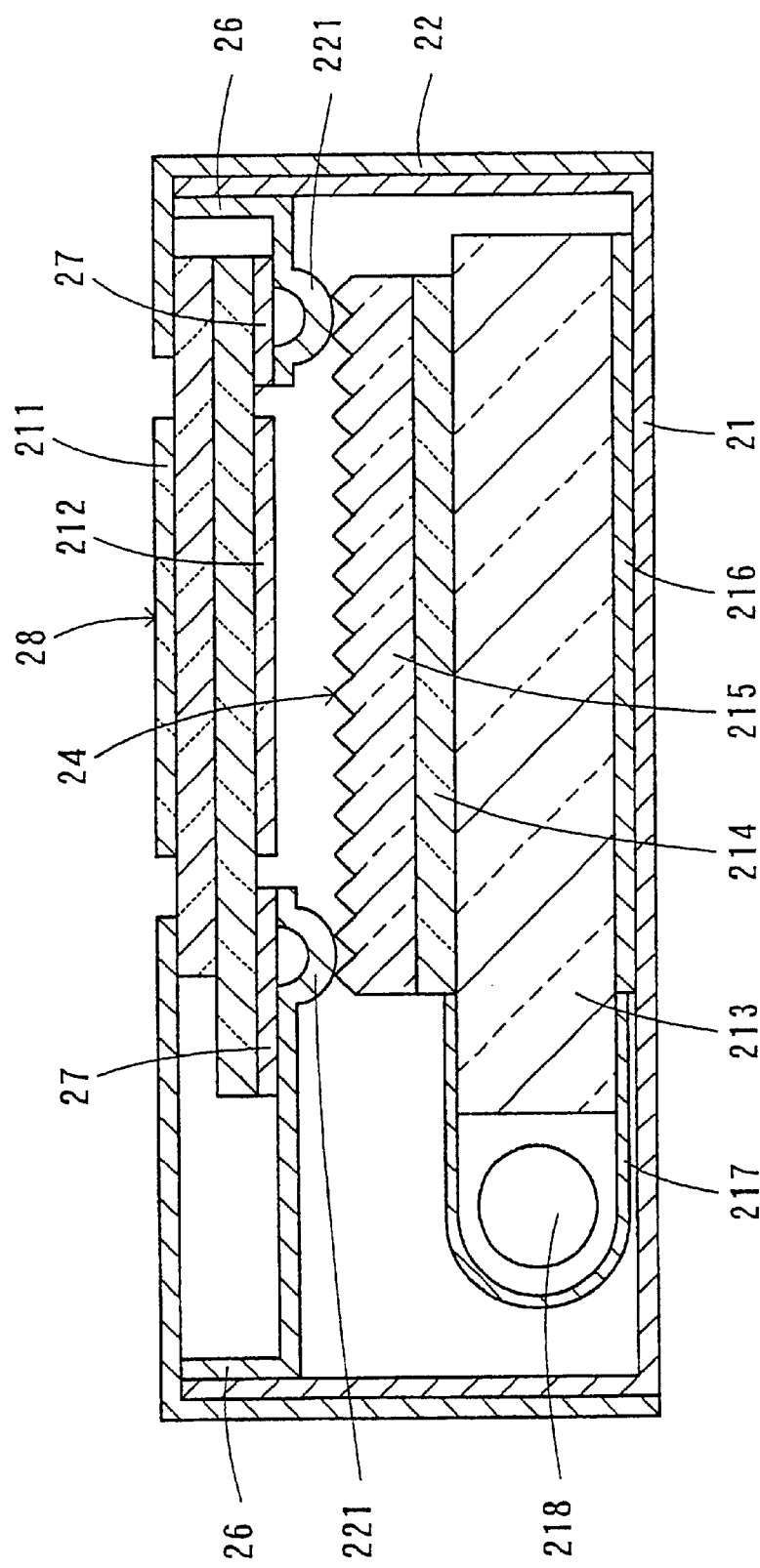
FIG. 12 is a cross sectional view showing a conventional LCD module.

As shown in FIG. 11, a reinforcing ring 11 may be formed around each of the mounting holes 10 and 91. The reinforcing ring 11 may be a plastic ring, or a ring-shaped sheet for hole reinforcement prepared for generally-sold loose-leaf type papers.

In the above embodiments, the sealing sections 71, 72, 73 and 74 are formed using the thermocompression technique. However, any adhesive tapes or glues may be used for sealing up the bag 4 or the shaped resins 9.

A slit may be made in the bag 4 in advance. In this case, the bag 4 is torn at the slit after the semi-finished product 8 is contained into the bag 4, so as to expose the display area of the display panel 1. In this case, the bag 4 need not be transparent.

Otherwise, a slit may be made in one of the shaped resins 9. In this case, after the semi-finished product 8 is fixed between the pair of shaped resins 9, the one of the shaped resins 9 may be torn at the slit so as to expose the display area of the display panel 1. Because the semi-finished product 8 is sandwiched between the pair of shaped resins 9, the area of the slit needs: to be set smaller than the area of the display panel 1. In this case, the shaped resins 9 need not be transparent.

The one of the shaped resins 9 may include a window for exposing the area of the display panel 1 for displaying letters, image, etc. Because the semi-finished product 8 is sandwiched between the pair of shaped resins 9 so as to fixed therebetween, the size of the window is set smaller than the area of the display panel 1. In this case, the shaped resins 9 need not be transparent.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-020414 filed on Jan. 28, 2000, and including specification, claims, drawings and summary. The disclosure of the above Japanese Patent Application is incorporated herein by reference in its entirety.

What is claimed is:

1. A display module comprising:
    a liquid crystal panel which includes a display area for displaying an image;
    a light emitter which is arranged on said liquid crystal panel, and emits light for displaying the image; and
    a resin bag which contains and fixes said liquid crystal panel and said light emitter, and includes at least an area through which the display area is externally visible, said bag having a closeable opening.

2. The display module according to claim 1, wherein an inside of said resin bag is retained in a low-pressure atmosphere.

3. The display module according to claim 2, further comprising a first connector connected to said liquid crystal panel for supplying a signal from an external source, and a second connector connecting said light emitter to a power source for supplying power for displaying said image, and
    wherein said resin bag has first and second lead-through holes for taking out said first and second connectors, and a peripheral section of each of said first and second lead-through holes is sealed.

4. The display module according to claim wherein said resin bag includes a mounting hole for mounting said display module into another device, on a corner thereof.

5. The display module according to claim 4, wherein a peripheral section of the mounting hole is sealed up.

6. The display module according to claim 4, wherein the peripheral section of the mounting hole is reinforced with a reinforcing member.

7. The display module according to claim 4, wherein said resin bag is formed from a transparent member.

8. The display module according to claim 4, wherein said light emitter is larger in size than said liquid crystal panel, and includes another mounting hole in an area of said light emitter which sticks out from said liquid crystal panel, said another mounting hole is aligned with the mounting hole of the resin bag.

9. The display module of claim 1, further comprising a plurality of flexible wiring sheets connected to said liquid crystal panel.

10. A method for manufacturing a display module, comprising the steps of:
    forming a semi-finished product by assembling a liquid crystal panel, which has a display area for displaying an image, and a light emitter, which emits light for displaying the image;
    inserting the semi-finished product into a resin member, the resin member including an area through which at least the display area is externally visible; and fixing the semi-finished product inside the resin member, said fixing step includes removing air or gas from the resin member, thereby hermetically sealing the resin member, the resin member being in contact with the semi-finished product, wherein the resin member is a bag.

11. The method for manufacturing a display module according to claim 10, wherein the display panel includes a connector for supplying a signal and power source for displaying a predetermined image, and said method further comprising forming a lead-through hole for taking out the connector, after the semi-finished product is fixed inside the resin member.

12. The method for manufacturing a display module according to claim 11, wherein said forming the lead-through hole includes forming the lead-through hole after a peripheral section of the hole is sealed up.

13. The method for manufacturing a display module according to claim 12, wherein a predetermined area of the resin member is removed so as to expose the display area.

14. The method for manufacturing a display module, according to claim 12, wherein the light emitter is larger in size than the liquid display panel, and includes a mounting hole in an area of said light emitter which sticks out from said liquid crystal panel, and said method further comprising:

forming a penetrating hole by forming a hole in a position of the resin member which corresponds to a position of the mounting hole, after fixing the semi-finished product inside the resin member.

15. The method for manufacturing a display module according to claim 12, wherein said forming the lead-through hole includes sealing up the peripheral section of the lead-through hole, using a thermocompression technique or adhesive tape.

16. The method for manufacturing a display module according to claim 10, wherein the display panel includes a connector for supplying a signal and power source for displaying a predetermined image, and said method further comprising, forming a lead-through hole for taking out the connector in the resin member, before fixing the semi-finished product inside the resin member.

17. The method for manufacturing a display module according to claims 16, wherein:

the resin member has an opening for inserting the semi-finished product; and said fixing the semi-finished product inside the resin member includes removing air or gas from the resin member through the lead-through hole, after sealing up the opening.

18. The method for manufacturing a display module according to claim 17, wherein a predetermined area of the resin member is removed, so as to expose the display area.

19. The method for manufacturing a display module according to claim 17, wherein the light emitter is larger in size than the liquid crystal panel, and includes a mounting hole for mounting said display module into another device in an area of the light emitter which sticks out from the liquid crystal panel, and said method further comprising, forming a penetrating hole by forming a hole in a position of the resin member which corresponds to a position of the mounting hole, after fixing the semi-finished product inside the resin member.

20. The method for manufacturing a display module according to claim 17, wherein said fixing the semi-finished product includes sealing up the opening using a thermocompression technique or adhesive tape.

21. A display module comprising:

a liquid crystal display panel having a plurality of flexible wiring sheets connected thereto;

a light emitter adjacent to said liquid crystal display panel, said plurality of flexible wiring sheets bending about said light emitter to fix said liquid crystal display panel to said light emitter; and a resin containing means for containing said liquid crystal display and said light emitter therein.

22. A display module comprising:

a liquid crystal display panel;

a light emitter adjacent said liquid crystal display panel;

first and second shaped resins being shaped to contain said liquid crystal display and said light emitter; and means for connecting said first and second shaped resins to each other at a peripheral edge of each said first and second shaped resins.

* * * * *